United States Patent [19]

Yoshida

[11] Patent Number: 4,633,390
[45] Date of Patent: Dec. 30, 1986

[54] MICROPROGRAM CONTROL SYSTEM

[75] Inventor: Nobuyuki Yoshida, Tokyo, Japan

[73] Assignee: Tokyo Shibaura Denki Kabushiki Kaisha, Kawasaki, Japan

[21] Appl. No.: 254,762

[22] Filed: Apr. 16, 1981

[30] Foreign Application Priority Data

Apr. 25, 1980 [JP] Japan .................................. 55-55021

[51] Int. Cl.[4] .............................................. G06F 9/14
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,800,293 | 3/1974 | Enger et al. | 364/200 |
| 3,990,054 | 11/1976 | Perlowski | 364/200 |
| 4,047,247 | 9/1977 | Stanley et al. | 364/200 |
| 4,080,648 | 3/1978 | Asano et al. | 364/200 |
| 4,131,943 | 12/1978 | Shiraogawa | 364/200 |
| 4,173,041 | 10/1979 | Dvorak et al. | 364/200 |
| 4,179,737 | 12/1979 | Kim | 364/200 |
| 4,197,578 | 4/1980 | Wada et al. | 364/200 |
| 4,245,302 | 1/1981 | Amdahl | 364/200 |
| 4,266,281 | 5/1981 | Struger et al. | 364/900 |
| 4,316,244 | 2/1982 | Grondalski | 364/200 |
| 4,371,925 | 2/1983 | Casberry et al. | 364/200 |
| 4,415,969 | 11/1983 | Bayliss et al. | 364/200 |

FOREIGN PATENT DOCUMENTS

| | | |
|---|---|---|
| 2846537 | 10/1978 | Fed. Rep. of Germany . |
| 1192368 | 5/1970 | United Kingdom . |
| 1364800 | 8/1974 | United Kingdom . |
| 1398367 | 6/1975 | United Kingdom . |
| 1547385 | 5/1979 | United Kingdom . |
| 1578392 | 11/1980 | United Kingdom . |

OTHER PUBLICATIONS

Mick et al, *Bit-Slice Microprocessor Design*, publ. McGraw-Hill, 1980, pp. 13–49.
Mick et al, *Advanced Micro Devices Microprogramming Handbook*, 1976, pp. 1-1 through 1-7.

Primary Examiner—Gareth D. Shaw
Assistant Examiner—Kevin A. Kriess
Attorney, Agent, or Firm—Kenyon & Kenyon

[57] ABSTRACT

A microprogram control system of the invention has a mapping read only memory storing the respective initial addresses of a plurality of microprogram routines corresponding to a macroinstruction. The address input information to this mapping read only memory is obtained from an output of a binary counter which counts every time a JUMP instruction for making a branch to another microprogram routine is decoded, and from an output of a latch circuit for holding the operation code of the macroinstruction. When the microprogram routine has loops, a count inhibit signal is input to the binary counter so that the same address input information may be supplied to the mapping read only memory.

3 Claims, 7 Drawing Figures

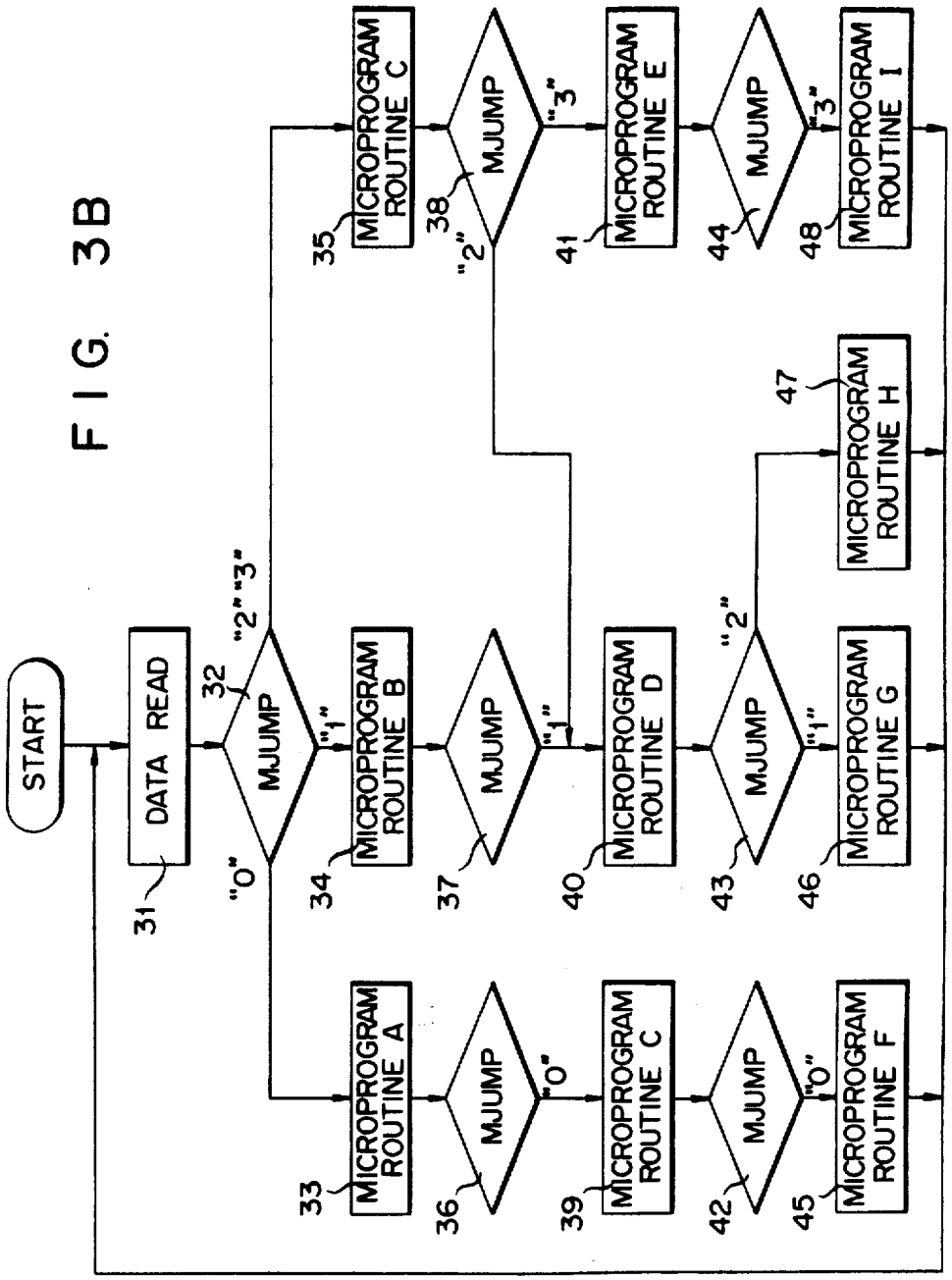

MICROPROGRAM CONTROL SYSTEM

BACKGROUND OF THE INVENTION

The present invention relates to a microprogram control system and, more particularly, to a control system for executing microinstructions.

A microprogram control system is a typical system for controlling the operation and status of various logic units such as central processing units and input/output devices. In such a microprogram control system, a microprogram routine corresponding to a user instruction (referred to as a macroinstruction hereinafter) is executed.

FIG. 1 is a schematic block diagram of a microprogram control system according to the prior art.

Referring to FIG. 1, microinstructions for designating the kind of control to be performed, the subject of the control, the control procedure and so on are stored according to a predetermined format in respective address memory locations of a control memory 1. The memory locations in the control memory 1 are designated by respective addresses in a memory address register 4 under the control of a memory address control circuit 3, and the microinstructions in locations designated by predetermined addresses are sequentially read out of the control memory to a microinstruction register 2. The microinstructions read out in this manner are decoded into a series of control signal sequences by a decoder 5 which controls the operation and status of the logic units. The part of a next address designating a memory location in the control memory is input to the memory address control circuit 3 which then specifies the address of the control memory 1 to be accessed next according to various conditions. In order, however, to effect a jump to a routine in a program for executing other processes with certain data (e.g., macroinstructions), a step was required for reading out and decoding the data (the operation code (OP code) of the macroinstruction). This resulted in various disadvantages usually caused by the increase in the number of steps, which resulted in an increase in the required control memory capacity and a reduction in processing speed.

OBJECT AND SUMMARY OF THE INVENTION

It is an object of the present invention to provide a microprogram control system which overcomes the above disadvantages. This and other objects are achieved in accordance with the present invention in which: a plurality of microprogram routines correspond to one macroinstruction; an index ROM stores the initial addresses of said respective microprogram routines; addresses are generated which consist of the operation code of the macroinstruction and an output of a counter incremented each time a jump instruction inserted at the final step of a routine is decoded; and said index ROM is accessed to generate initial addresses of said respective microprogram routines.

In order to achieve this object, there is provided a control system for executing a macroinstruction which includes a plurality of microprogram routines comprising:

a microprogram ROM for storing a microprogram;

a microinstruction register for storing microinstructions output from said ROM;

a decoder for decoding an instruction stored in said microinstruction register;

microprogram sequence control means for performing sequence control of said microprogram ROM:

a mapping ROM for supplying an initial address of a microprogram routine to said microprogram sequence control means; and means for supplying an input address for indexing the initial addresses from said mapping ROM of a plurality of microprogram routines for said macroinstruction.

According to the microprogram control system of the present invention, the initial addresses of a plurality of microprogram routines for executing a macroinstruction at the level of a microprogram may be stored, so that the microprogram routines need not be grouped together for one macroinstruction. Therefore, the respective microprogram routines stored in the microprogram ROM are not prepared more than once. Thus, it suffices to store basic microprogram routines and to designate the initial address of each microprogram routine by a multi-JUMP (referred to as an MJUMP instruction hereinafter) according to the processing content of the macroinstruction.

Furthermore, since the MJUMP instruction not only has a branch function but also the logic operation function (e.g., the branch function and a adding function, the branch function and the subtracting function and so on), processing which has conventionally required two steps may be executed in one step. Thus, the number of microsteps may be significantly reduced as compared with conventional systems. Accordingly, the memory capacity of the microprogram ROM may be reduced and the processing speed may also be increased. The preparation of the program becomes very simple since the initial addresses of the required microprogram routines need only be designated by the JUMP instruction.

This invention can be more fully understood from the following detailed description when taken in conjunction with the accompanying drawings.

BRIEF DESCRIPTION OF THE DRAWINGS

Other objects and features of the present invention will be apparent from the following description when taken in connection with the accompanying drawings in which:

FIGS. 3A and 3B are flow charts showing operations for decoding a macroinstruction and making a JUMP to the corresponding microprogram routine, wherein FIG. 3A shows a conventional operation and FIG. 3B shows an operation in accordance with an embodiment of the present invention;

FIG. 4 is a flow chart showing operation according to an embodiment of the present invention when a JUMP instruction is used in a microprogram routine having loops and FIGS. 5A and 5B show formats of microinstructions, wherein FIG. 5A shows a conventional format of a microinstruction and FIG. 5B shows a format of a microinstruction according to an embodiment of the present invention.

DESCRIPTION OF THE PREFERRED EMBODIMENTS

Figure 1:
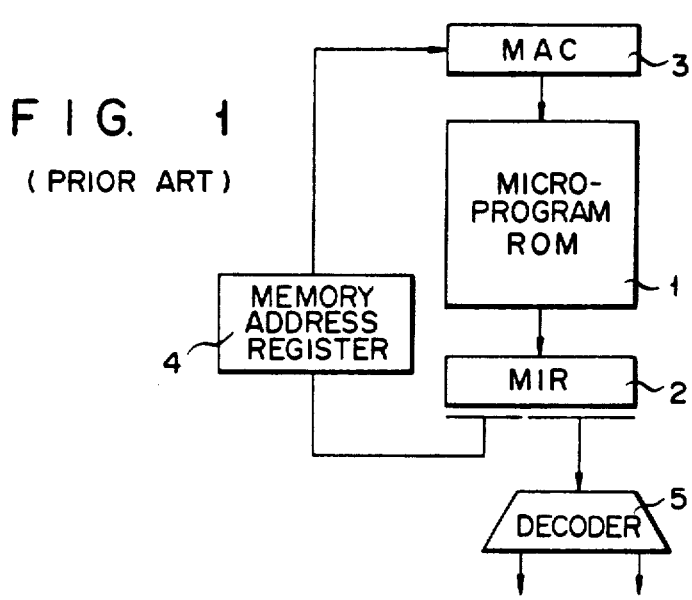
FIG. 1 is a block diagram of a conventional microprogram control unit.
Figure 2:
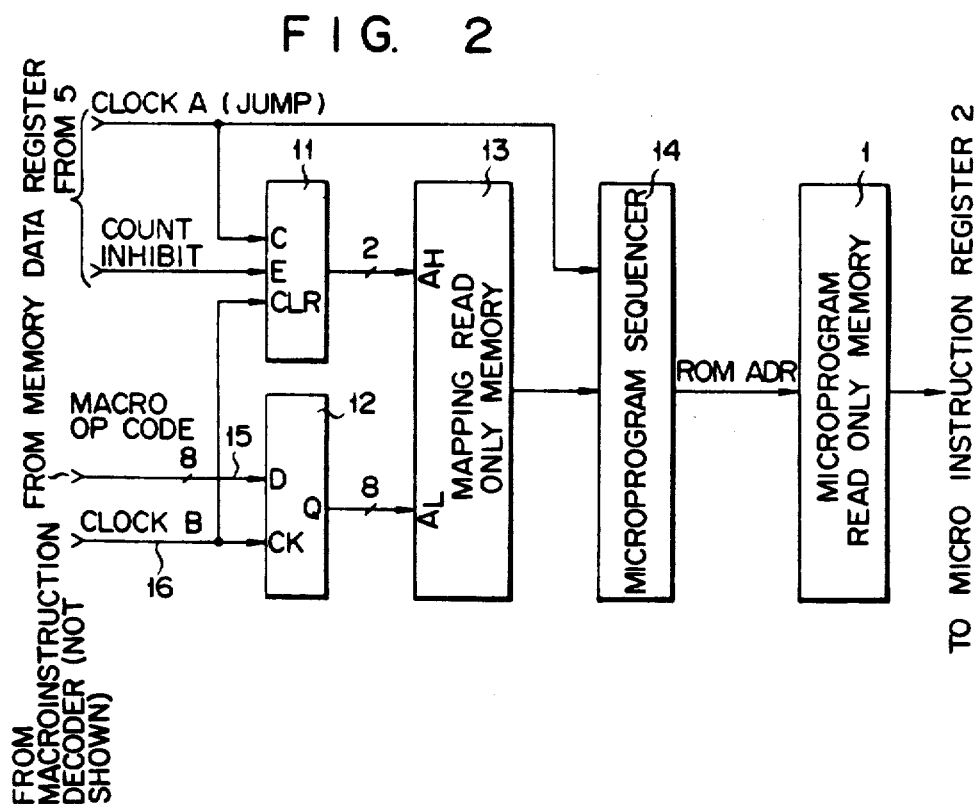
FIG. 2 is a block diagram illustrating a microprogram control system according to an embodiment of the present invention.

FIG. 2 is a block diagram of the microprogram control system according to an embodiment of the present invention. Referring to FIG. 2, reference numeral 11 denotes a 2-bit binary counter which has a clock input terminal (C), a count inhibit terminal (E), and a clear terminal (CLR). A clock signal is output from a microinstruction decoder (not shown) and is supplied to the clock input terminal every time an MJUMP instruction used in the present invention is decoded by the decoder. To the count inhibit terminal is input a signal for inhibiting counting when an MJUMP instruction is used in a routine having loops (as will be described in more detail hereinafter). When a clear signal is input to the clear terminal, counter 11 is reset. The binary counter 11 can have a 2-bit binary count value of from "00" to "11" after a the clock signal is input. This count value becomes the address of the higher order 2 bits of a mapping read only memory 13 to be described later. Reference numeral 12 denotes an 8-bit latch circuit. A user instruction (referred to hereinafter as a macroinstruction, and to be distinguished from a microinstruction) is decoded by a macroinstruction decoder (not shown) and its operation code is latched in this latch circuit 12 in synchronism with a clock B signal. The clock B signal is output from the macroinstruction decoder every time a macroinstruction is fetched. This clock B signal is supplied to a clock input terminal (CK) of the latch circuit 12 as well as to the clear terminal of the 2-bit binary counter 11 for clearing the binary counter. Thus, the contents of the binary counter 11 are reset every time a macroinstruction is fetched. The 8-bit data output from the latch circuit 12 is used as the lower order 8 bits of the address information of the mapping read only memory 13. This address information totaling 10 bits output from the binary counter 11 and the 8-bit latch circuit 12 is supplied to the mapping read only memory 13. The mapping read only memory 13 is a microprogram ROM address table storing the initial addresses of microprogram routines stored in a microprogram read only memory 1 to be described later. The mapping ROM 13 outputs address information of the microprogram ROM 1 stored in the corresponding location designated by the input address information, and supplies it to a microprogram sequencer 14. The microprogram sequencer 14 controls the sequence of the group of microprograms stored in the microprogram ROM 1. In this embodiment, the microprogram sequencer 14 is an AM2911 microprogram sequencer of Advanced Micro Devices, Inc., Sunnyvale, Calif. Since a detailed description of the AM2911 is included in the "The AM2900 Family Data Book", the description thereof will be omitted. The ROM address output from this microprogram sequencer 14 is supplied to the microprogram ROM 1. The microprogram ROM 1 outputs a microinstruction from the location corresponding to the input address.

The mode of operation of this embodiment of the present invention will now be described. The correspondence between the operation code of the macroinstruction and microprogram routines is set in accordance with the Table below in which three microprogram routines are considered to correspond to one macroinstruction. If the OP code of the macroinstruction is "0", first a microprogram routine A is executed, then a microprogram routine C is executed, and finally a microprogram routine F is executed.

TABLE

| MACRO-INSTRUCTION OP CODE | 0 | 1 | 2 | 3 |
|---|---|---|---|---|
| PROCESS 1 | A | B | C | C |
| PROCESS 2 | C | D | D | E |
| PROCESS 3 | F | G | H | I |

Figure 3A:
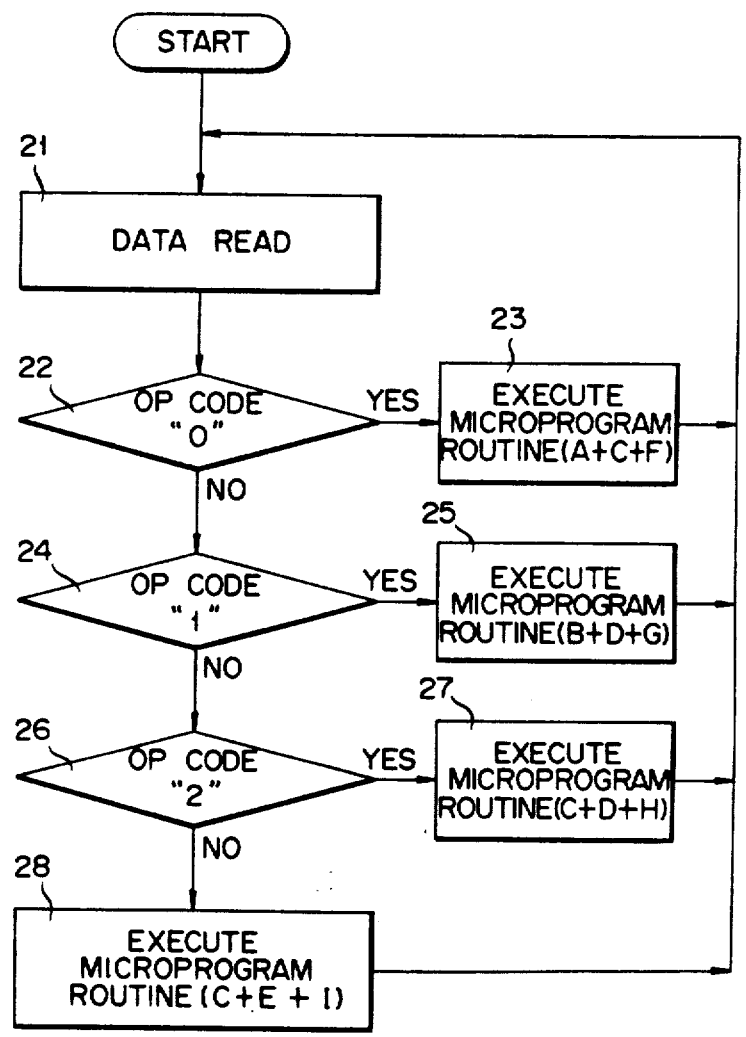

Similarly, if the OP code is "1", a microprogram routine B, a microprogram routine D, and a microprogram routine G are executed in that order. If the OP code is "2", the microprogram routine C, the microprogram routine D, and a microprogram routine H are executed in that order. If the OP code of the macroinstruction is "3", the microprogram routine C, is microprogram routine E, and a microprogram routine I are executed in the order named. These operations are shown by flow charts. FIG. 3A is a flow chart showing conventional processing, and FIG. 3B is a flow chart showing processing according to the present invention.

In step 21 in FIG. 3A, the macroinstruction is fetched and its OP code is decoded. In step 22, its OP code is decoded. If it is "0", a microprogram routine (A+C+F) including the above-mentioned microprogram routines A, C and F is executed in step 23. If the OP code is not "0", processing advances to step 24 for determining whether or not the OP code is "1". If the OP code is "1", a microprogram routine (B+D+G) including the abovementioned microprogram routines B, D and G is executed in step 25. If the OP code is not "1", processing advances to step 26 to determine whether or not the OP code is "2". If the OP code is "2", a microprogram routine (C+D+H) including the abovementioned microprogram routines C, D and H is executed in step 27. If the OP code is not "2", processing advances to step 28 and a microprogram routine (C+E+I) including the abovementioned microprogram routines C, E and I is executed upon the assumption that the OP code is "3".

On the other hand, the processing of the present invention shown in FIG. 3B is as follows. First, a macroinstruction is fetched in step 31. At this time a clock signal B (FIG. 2) is output on line 16 from the decoder 5 and supplied to the CK input terminal of the latch circuit 12 as well as to the counter 11. Consequently, the OP code of the macroinstruction present at input D of the latch circuit 12 is loaded into the latch circuit from a memory data register (not shown), and the counter 11 is cleared. An address consisting of the output of the binary counter 11 and the latch circuit 12 is thereby supplied to the mapping ROM 13. The mapping ROM 13 then outputs the address in the microprogram ROM 1 used for the MJUMP instruction and supplies this address to the microprogram sequencer 14. Then, the MJUMP instruction is decoded in step 32 as follows. The decoder 5 supplies a clock A signal to the microprogram sequencer 14. Thus, the output of the mapping read only memory 13 is loaded in the microprogram sequencer 14 to produce a next address of the microprogram ROM 1. Also, the output signal clock A of the decoder 5 is supplied to the binary counter 11 so that the counter 11 is incremented to produce the next address of the mapping ROM 13 for the MJUMP instruction. According to this embodiment, if the OP code in the Table is "0", the initial address of the microprogram routine A is output. If the OP code is "1", the initial address of the microprogram routine B is output. If the OP code is "2" or "3", the initial address of the microprogram routine C is output. Thus, the microprogram ROM 1 performs the microprogram routine A as shown in step 33 when the OP code is "0", the microprogram routine B as shown in step 34 when the OP code is "1", and the microprogram routine C as shown in step 35 when the OP code is "2" or "3". In the steps that follow, addresses of the microprogram ROM 1 are generated and accessed under control of the microprogram sequencer 14, and the corresponding microinstructions are read out from the microprogram ROM 1 for execution. As shown in steps 36, 37 and 38, when the MJUMP instruction included as the last step of the microprogram routine for performing a branch to the next microprogram routine is decoded by the decoder 5, the microprogram ROM 1 is accessed by the same procedure as described above. As shown in steps 39, 40 and 41, the microprogram routine C is executed when the OP code is "0", the microprogram D is executed when the OP code is "1" or "2", and the microprogram routine E is executed when the OP code is "3".

According to the steps in the microprogram routines C, D and E, microinstructions are executed in a manner similar to that described in connection with microprogram routines A, B, C in steps 33, 34 and 35 under the control of the microprogram sequencer 14, and the MJUMP instruction as the last step is fetched and decoded as shown in steps 42, 43 and 44. Thus, as shown in steps 45, 46, 47 and 48, the microprogram routine F is executed when the OP code is "0", the microprogram routine G is executed when the OP code is "1", the microprogram routine H is executed when the OP code is "2", and the microprogram routine I is executed when the OP code is "3". According to the steps in the microprogram routines F, G, H and I, microinstructions are executed in a manner similar to that described above for microprogram routines A, B, C under the control of the microprogram sequencer 14. By the general JUMP instruction included as the last step of the microprogram routines F, G, H and I, processing returns to step 31 for data reading.

Figure 4:
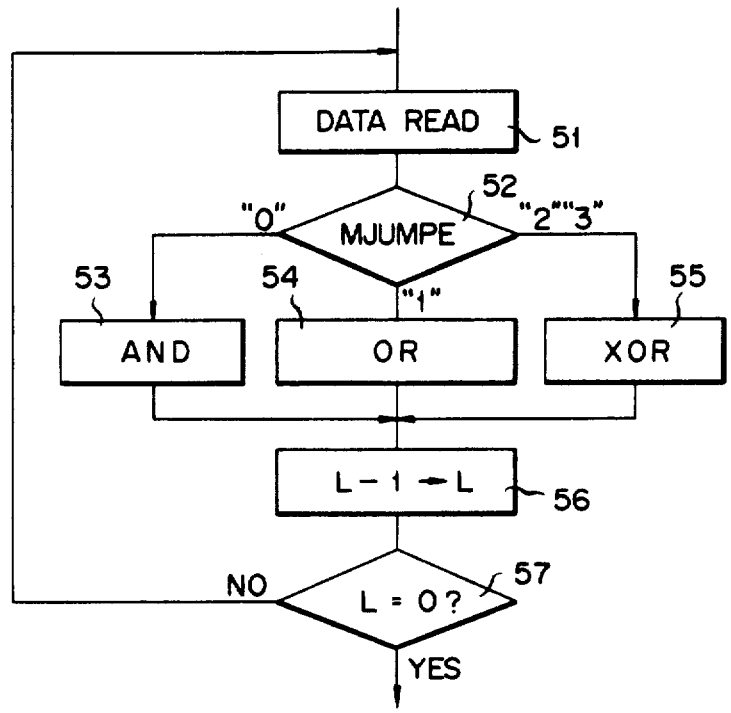

FIG. 4 illustrates the case where a number of jumps must be made to the same address in a microprogram routine having loops. Since the binary counter 11 counts every time the MJUMP instruction is fetched and decoded according to the system of the present invention, one counter is required for each loop. However, according to the present invention, an MJUMP instruction (MJUMPE) is incorporated for inhibiting counting. When this instruction is fetched and decoded, a count inhibit signal is input to the terminal E of the binary counter 11 (FIG. 2) for inhibiting counting thereof. As a result, the same address is output from the mapping read only memory 13, and the microprogram ROM 1 outputs the same microinstruction.

In the embodiment shown in FIG. 4, a macroinstruction is fetched and decoded as has been described with reference to the flow chart of FIG. 3B. The mapping ROM 13 is accessed utilizing the OP code of this macroinstruction as address input information, and data in the microprogram ROM 1 is output from the corresponding location. This address from the macroinstruction is supplied to the microprogram ROM 1, and the microinstruction (in this case, the MJUMP instruction (MJUMPE) for inhibiting the counting operation) is read out from the corresponding location of the microprogram ROM1 and executed (step 52). When the OP code of the macroinstruction is "0", for example, an AND operation is performed in step 53. An OR operation is performed in step 54 when the OP code is "1". An exclusive-OR operation is performed in step 55 when the OP code is "2" or "3". The counter representing the number of loops is decremented by 1 in step 56, and a determination is made as to whether or not the counter is "0" in step 57. If the counter is not "0", the program returns to step 51 for data reading. If the counter is "0", the program leaves the loop and advances to the next step.

Figure 5A:
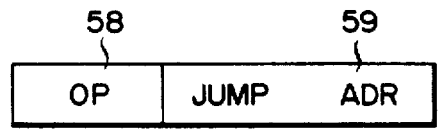
Figure 5B:
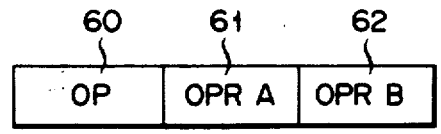

FIGS. 5A and 5B show formats of the microinstructions, wherein FIG. 5A shows a JUMP instruction (microinstruction) according to the prior art. This instruction consists of an operation code (OP code) part 58 and an operand part 59. The operation code corresponding to JUMP is written in the operation code part 58, and the address indicating the jump destination is written in the operand part 59.

As for the MJUMP instruction shown in FIG. 5B according to the present invention, codes for the MJUMP and another operation (for example, the MJUMP+addition) are written in an operation code part 60, and a source register and a destination register are written in an operand A 61 and an operand B 62, respectively. As a result, the MJUMP instruction according to the present invention is capable not only of a JUMP to another microprogram routine but also of various logic operations such as addition and subtraction with the operand A 61 and the operand B 62.

What is claimed is:

1. A microprogram control system for executing macroinstructions, each macroinstruction including an operation code, comprising:
 (a) a microprogram read only memory, having an output at which a microinstruction is provided, for storing microinstructions including JUMP instructions, which compose a plurality of microprogram routines given ones of which correspond to given macroinstructions, each microprogram routine ending with a JUMP instruction;
 (b) a microinstruction register, coupled to receive and store the microinstruction provided at the output of said microprogram read only memory, said microinstruction register having an output at which the microinstruction is provided;
 (c) a decoder, coupled to receive and decode the microinstruction provided at the output of said microinstruction register, and having an output at which a signal is provided each time a JUMP instruction is decoded;
 (d) latch circuit means, having a first input for receiving an operation code of a macroinstruction to be executed and having a second input for receiving a signal indicating that the macroinstruction to be executed has been decoded, and having an output at which the operation code is provided, for storing the operation code, said latch circuit means being latched in response to the signal at said first input each time a new macroinstruction is decoded;
 (e) means for supplying input addresses, having a first input coupled to receive the signal at the output of said decoder and having a second input coupled to the second input of said latch circuit means and having an output at which an input address is provided, including:
  (i) counting means, coupled so as to increment its count in response to the signal at the first input of said means for supplying and coupled so as to clear in response to the signal at the second input of said means for supplying, said counting means generating an output count appearing as higher order bits of the input address, whereby said counting means is incremented at least once during execution of the macroinstruction; and (ii) means for coupling the output of said counting means with the output of said latch circuit means so that the operation code appears as lower order bits of the input address;

(f) a mapping read only memory, for storing start addresses of a plurality of microprogram routines, having an input coupled to receive the input address output by the means for supplying and having an output at which the start address of a next microprogram routine is provided, so that said plurality is indexed by the output of said means for supplying; and (g) microprogram sequence control means, having an input coupled to the output of said mapping read only memory and coupled to said microprogram read only memory, for reading said microprogram read only memory.

2. A system according to claim 1 wherein:
(a) said decoder includes a second output at which a signal is provided indicating that the JUMP instruction is part of a loop inside a microinstruction routine; and
(b) said counting means includes:
 (i) a third input coupled to the second output of the decoder; and
 (ii) means for inhibiting counting in response to the signal at said third input;
whereby said counting means is inhibited for loops inside a microinstruction routine.

3. A system according to claim 1 wherein at least one microprogram routine corresponds to more than one macroinstruction.

* * * * *